United States Patent
Saigo et al.

(10) Patent No.: US 6,587,880 B1
(45) Date of Patent: Jul. 1, 2003

(54) SESSION MANAGEMENT SYSTEM AND MANAGEMENT METHOD

(75) Inventors: Kikumi Saigo, Shizuoka (JP); Terunori Matsushima, Shizuoka (JP); Toshihiro Amaya, Shizuoka (JP); Naoko Hagihara, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/134,574

(22) Filed: Aug. 14, 1998

(30) Foreign Application Priority Data

Jan. 22, 1998 (JP) .......................................... 10-010803

(51) Int. Cl.[7] ............................................. G06F 13/00
(52) U.S. Cl. ..................... 709/225; 709/203; 709/217
(58) Field of Search .................................. 704/227, 201, 704/220, 224, 228; 709/200, 203, 217, 218, 219, 220, 223, 224, 225, 226

(56) References Cited

U.S. PATENT DOCUMENTS

| | | | | |
|---|---|---|---|---|
| 5,642,515 A | * | 6/1997 | Jones et al. .................. 710/220 |
| 5,708,780 A | * | 1/1998 | Levergood et al. ......... 709/212 |
| 5,758,084 A | * | 5/1998 | Silverstein et al. ......... 709/227 |
| 5,771,353 A | * | 6/1998 | Eggleston et al. .......... 709/227 |
| 5,835,724 A | * | 11/1998 | Smith ........................ 709/227 |
| 5,872,929 A | * | 2/1999 | Naito ........................ 709/223 |
| 6,006,331 A | * | 12/1999 | Chu et al. ................... 713/201 |
| 6,047,376 A | * | 4/2000 | Hosoe ........................ 713/201 |
| 6,065,120 A | * | 5/2000 | Laursen et al. ............. 713/201 |
| 6,088,728 A | * | 7/2000 | Bellemore et al. .......... 709/227 |
| 6,092,196 A | * | 7/2000 | Reiche ........................ 713/200 |
| 6,122,661 A | * | 9/2000 | Stedman et al. ............ 709/203 |
| 6,157,705 A | * | 12/2000 | Perrone ................... 379/88.01 |
| 6,170,017 B1 | * | 1/2001 | Dias et al. .................. 709/235 |
| 6,233,608 B1 | * | 5/2001 | Laursen et al. ............. 709/217 |

OTHER PUBLICATIONS

Abstract of U.S. Ser. No. 09/002,843, filed Jan. 5, 1998.

* cited by examiner

*Primary Examiner*—Moustafa M. Meky
(74) *Attorney, Agent, or Firm*—Staas & Halsey LLP

(57) ABSTRACT

The present invention relates to a session management system in which communications extending over a plurality of servers can be managed as an identical session. In this system, a URL received from an authenticated user bears a session management identifier. A display-data-creation-program control device having accepted the URL notifies it to a session-management-identifier management device. Upon verifying that the session management identifier is incorporated in the accepted URL, the identifier management device checks if a current session has been authenticated, by referring to the contents of a session-management-identifier management table. When the session has been authenticated as the result of the check, the session-management-identifier management device offers a service.

12 Claims, 13 Drawing Sheets

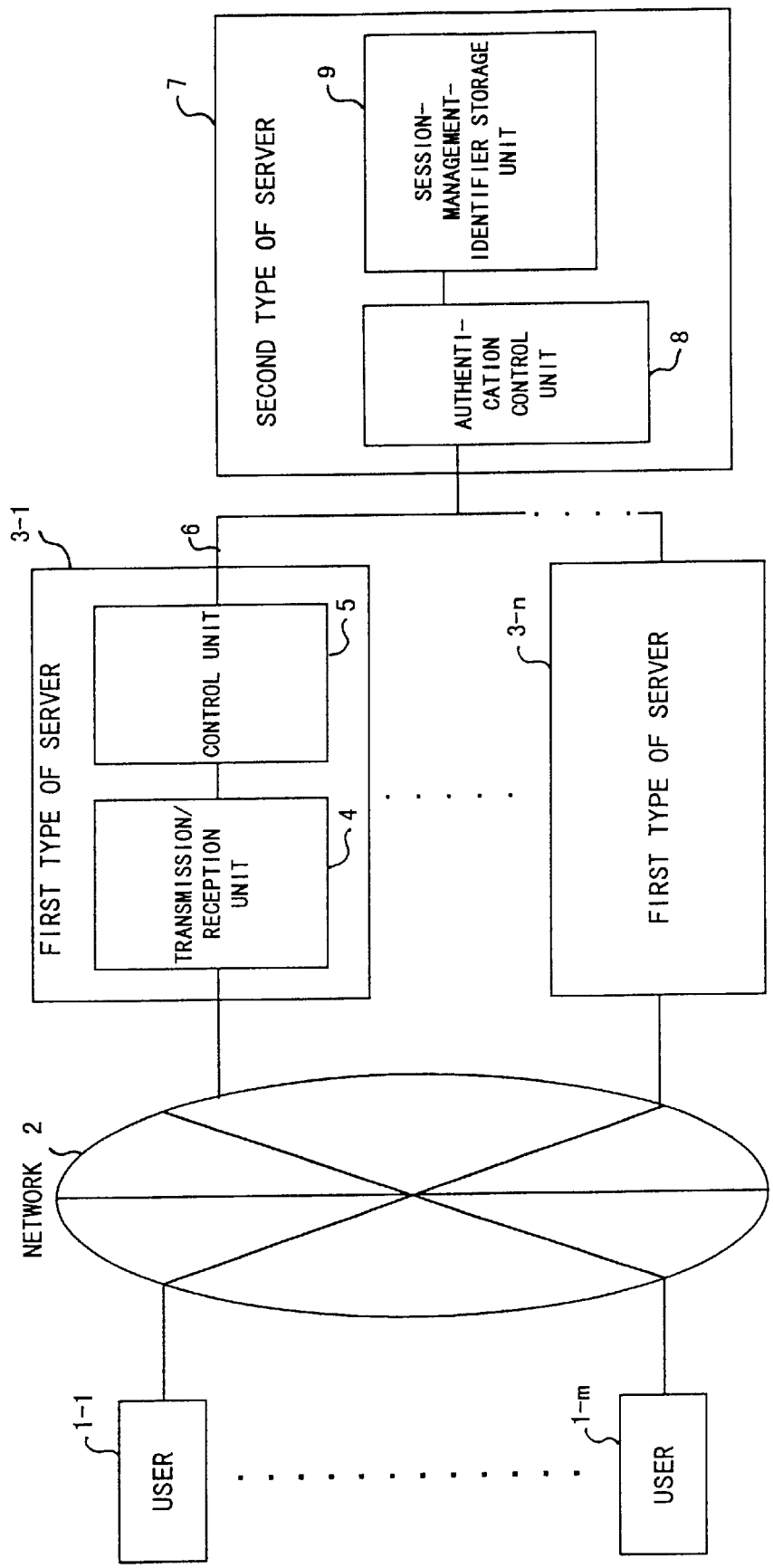
F I G. 1

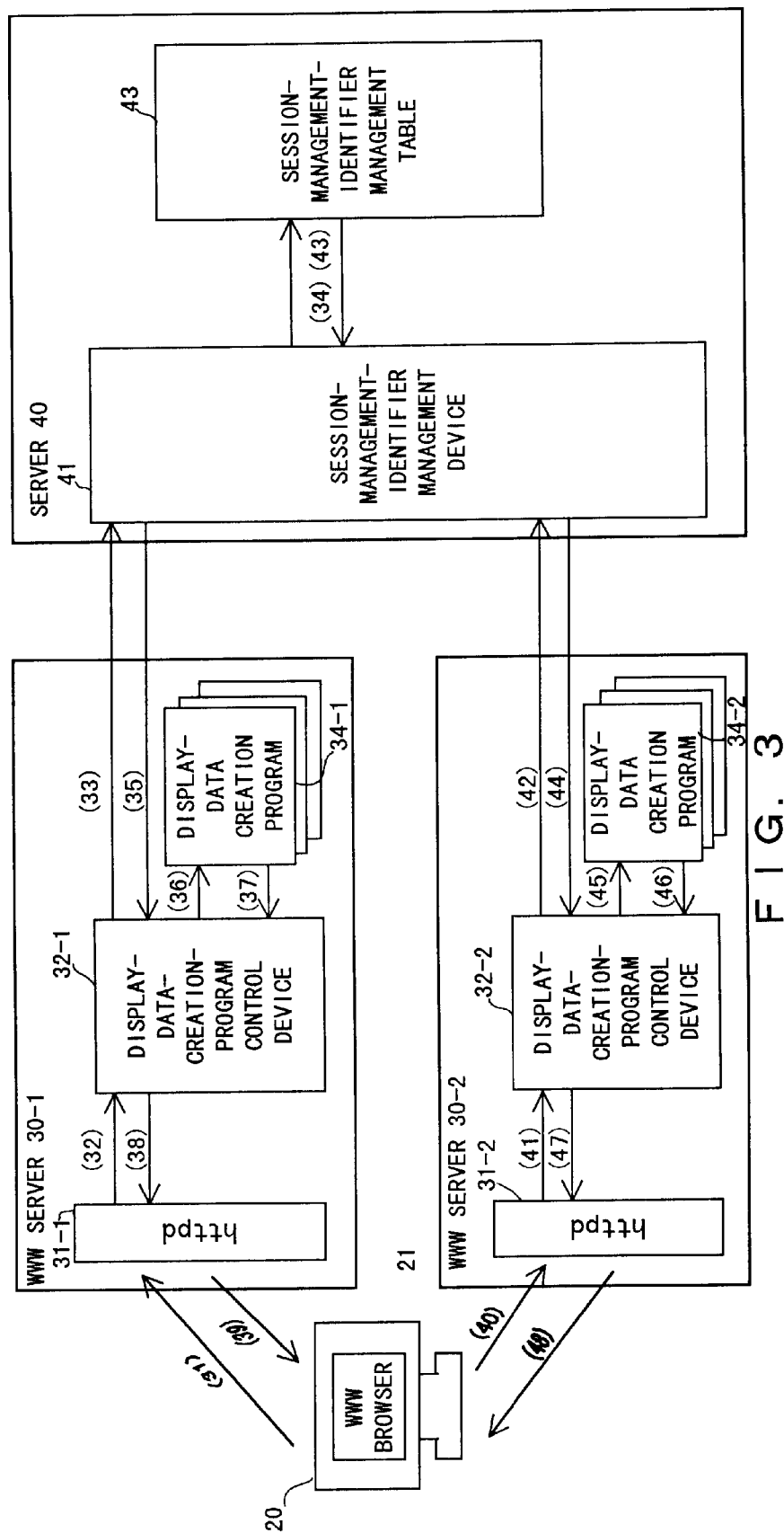
F I G. 3

FIG. 4A   http://xxxx/fname.html  ?id=aaaa, pw=bbbb

FIG. 4B   http://xxxx/cgiprog.cgi ?id=aaaa, pw=bbbb

FIG. 4C   http://xxxx/fname.html  ?sid=cccc

| USER ID | PASSWORD (PW) | AUTHENTICATION BEGINNING TIME | END TIME | SESSION MANAGEMENT IDENTIFIER (sid) | FINAL ACCESS TIME |
|---|---|---|---|---|---|
| AAAA | aaaa | 10:00 | 11:00 | XXXX | 10:25 |
| BBBB | bbbb | 10:05 | 11:05 | YYYY | 10:44 |
| CCCC | cccc | 10:07 | 11:07 | ZZZZ | 11:01 |
| --- | --- | --- | --- | --- | --- |

FIG. 5

```
<h4>
GOOD MORNING. <br>
IT IS (THE DATE) TODAY    <br>
</h4>
   .....
<h2>
<a href="http://xxxx/a.html ?sid=yyyy">         ~61
   TO IMAGE A   </a>  <br>
<a href="http://zzzz/b.html ?sid=yyyy">         ~62
   TO IMAGE B   </a>  <br>
</h2>
<p>
```
   .....

FIG. 6

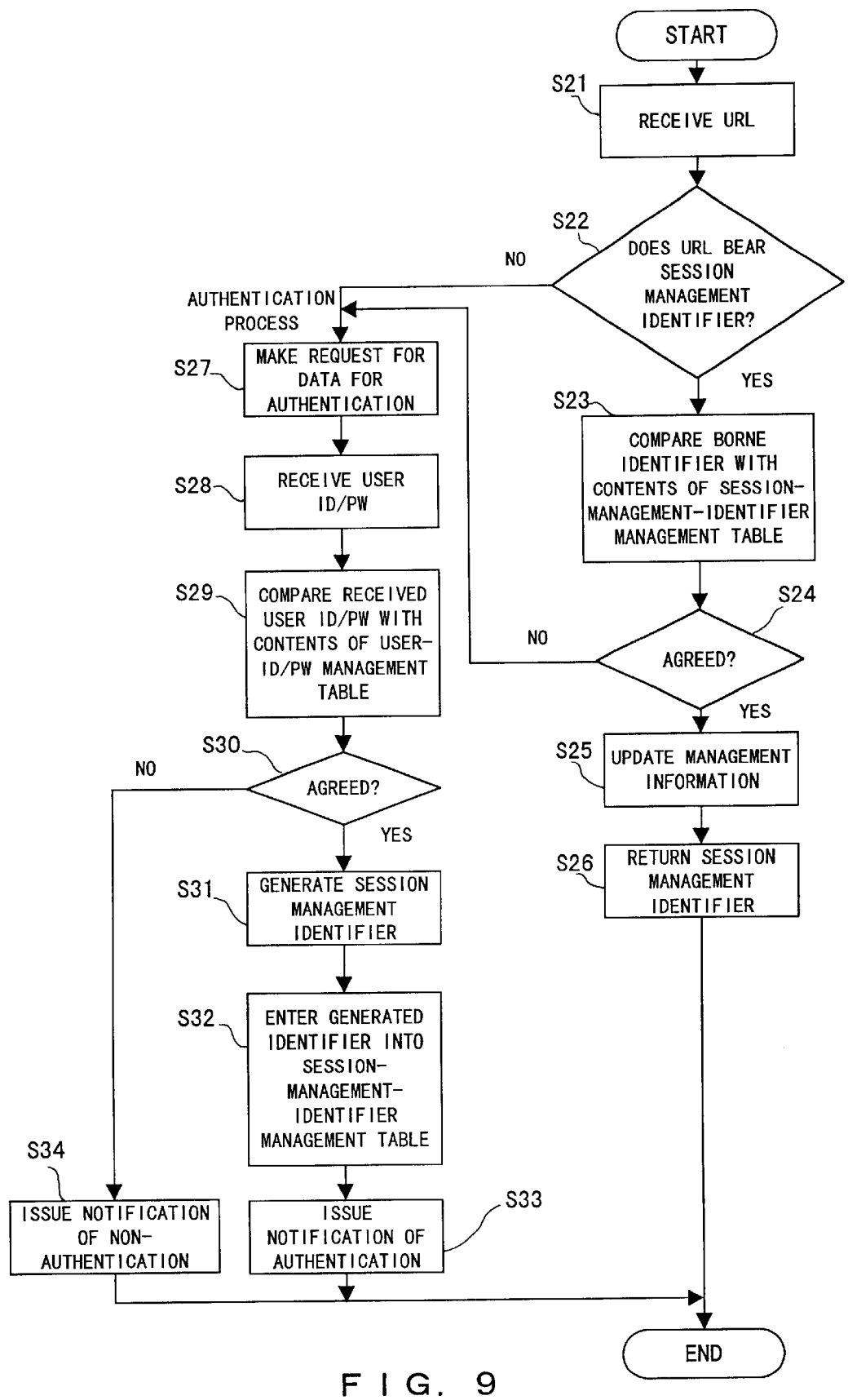
F I G. 9

SESSION MANAGEMENT SYSTEM AND MANAGEMENT METHOD

BACKGROUND OF THE INVENTION

1. Field of the Invention

The present invention relates to the session management among clients/servers. More particularly, it relates to a session management system and management method for session management in the case where a user makes an access from a client terminal to extending over a plurality of servers in stateless communications on the WWW (World Wide Web) etc.

2. Description of the Related Art

Nowadays, various networks connected by the Internet and computers located on the networks have realized a wide-area information system called the "WWW". In the WWW, software called a "WWW browser" is installed in a client computer which makes requests for services, and the WWW browser executes communication processing with WWW servers.

In the case where, on such a WWW, the WWW browser requests the WWW servers to offer the services of the transmission of a desired HTML (Hyper Text Markup Language) file, the search of a database, etc., how to manage sessions becomes a problem. Here, the word "session" signifies communications which proceed while communicating parties are recognizing the opposite parties.

In general, the HTTP (Hyper Text Transfer Protocol), which is a protocol employed for data communications between a WWW browser and a WWW server, is a stateless protocol having no state transition. Therefore, the session between the WWW browser and the WWW server is set when the former requests the latter to transmit a Web page, and it is reset or cut off when the server has transmitted the page.

Further, in a case where a next image has been accessed, another session is set. That is, each time one page is accessed, the previous session is reset, and quite a different session is set. Accordingly, the relevance of the next access to the preceding communications is not retained.

Under such an environment, even processing relevant to the preceding page is determined as a different session. It is therefore impossible to realize transaction processing, for example, a refined search in a database service, in which the exchange between the client terminal and the server is not completed by accessing the same Web site only once.

Considered as a method for solving the above drawback is one wherein associated software of a resident type is installed in the WWW server separately from a CGI (Common Gateway Interface) program of a nonresident type, thereby to recognize a session which extends over the image displays of a plurality of pages. In this case, an identifier for managing the session (hereunder, termed "session management identifier") is incorporated into the image data of the respective pages which are to be displayed on the WWW browser, and it is sent to the WWW browser. The associated software verifies the session management identifier which is transmitted from the WWW browser together with a page display request. Thus, it is permitted to hold an identical session.

With this method, however, both a process for managing the session management identifier and a process for incorporating the session management identifier into the display data of the respective pages to be displayed need to be prepared in individual programs for creating the display data of the respective pages.

Moreover, since the session management identifier is managed in every WWW server, a session which extends over a plurality of WWW servers cannot be managed.

Further, in a case where a membership page on the WWW server is to be accessed, a user needs to input his/her user ID and password because user IDs and passwords are authenticated and managed on the WWW server side. Since, however, the user IDs and the passwords are managed in every individual WWW server, a new access to a page on another WWW server is handled as a different session. Therefore, each time access is moved to another WWW server, an image for inputting the user ID and the password is displayed on the user's WWW browser at the request of the WWW server side, and the user needs to input his/her user ID and password again on each occasion. The input operation is cumbersome to the user.

SUMMARY OF THE INVENTION

The present invention has for its object to provide a session management system and management method which realize the management of a session extending over a plurality of servers.

It is the premise of a session management system according to the present invention that a plurality of users, and a plurality of servers of first type for offering services to the users are connected through a network, and that a server of second type is connected with the plurality of servers of first type.

Each of the first type of servers includes a transmission/reception unit and a control unit.

The transmission/reception unit transmits and receives data to and from the plurality of users through the network.

The control unit accepts a request made by the user from the transmission/reception unit, sends information based on the request to the second type of server, and offers the service complying with the user's request if a reply to the information as sent back from the second type of server indicates that the user has been authenticated.

On the other hand, the second type of server includes a session-management-identifier storage unit and an authentication control unit.

The session-management-identifier storage unit stores therein session management identifiers which uniquely identify sessions of the first type of servers with the respective users.

The authentication control unit sends notification indicating that the user has been authenticated, as the reply to the first type of server if the session management identifier contained in the information accepted from the first type of server agrees with any of the session management identifiers stored in the session-management-identifier storage means.

In addition, the authentication control unit sends notification indicating that authentication is necessary, as the reply to the first type of server if the session management identifier is not contained in the request. Then, the control unit of the first type of server requests the user to transmit information for the authentication, if the reply to the request is the notification indicating that the authentication is necessary.

Besides, the second type of server can further include an authentication-information storage unit for storing information for the user authentication therein. In this case, the control unit of the first type of server sends to the second type of server the information for the authentication as transmitted in from the user in compliance with the request for transmitting the authenticating information. Also, the authentication control unit assigns the session management identifier to the session with the user and stores it in the session-management-identifier storage unit if the authenticating information transmitted in from the user agrees with any of the user authenticating information stored in the authentication-information storage unit.

The second type of server can be constructed as a separate server which is independent of the first type of servers. Alternatively, the second type of server can be constructed so as to include all the functions of each of the first type of servers and to operate also as one of the first type of servers.

According to the present invention, an identical session management identifier can be carried about or shared among a plurality of servers. Therefore, even when a user has made requests of the plurality of servers, the respective servers can grasp the requests as an identical session, and session management extending over the plurality of servers can be realized.

BRIEF DESCRIPTION OF THE DRAWINGS

FIG. 1 is a block arrangement diagram showing the principle of the present invention;

FIG. 3 is a block arrangement diagram showing the architecture of the client/server system in the aspect of performance of the present invention, and the operation of the system after the authentication of the user;

FIGS. 4A, 4B and 4C are diagrams each showing an example of the format of an URL (Uniform Resource Locator);

FIG. 5 is a diagram exemplifying records which are entered in a session-management-identifier management table;

FIG. 6 is a diagram showing an example of display data in which a session management identifier is incorporated;

FIG. 9 is a flowchart showing a processing operation which is executed by a session-management-identifier management device;

DESCRIPTION OF THE PREFERRED EMBODIMENTS

Figure 2:
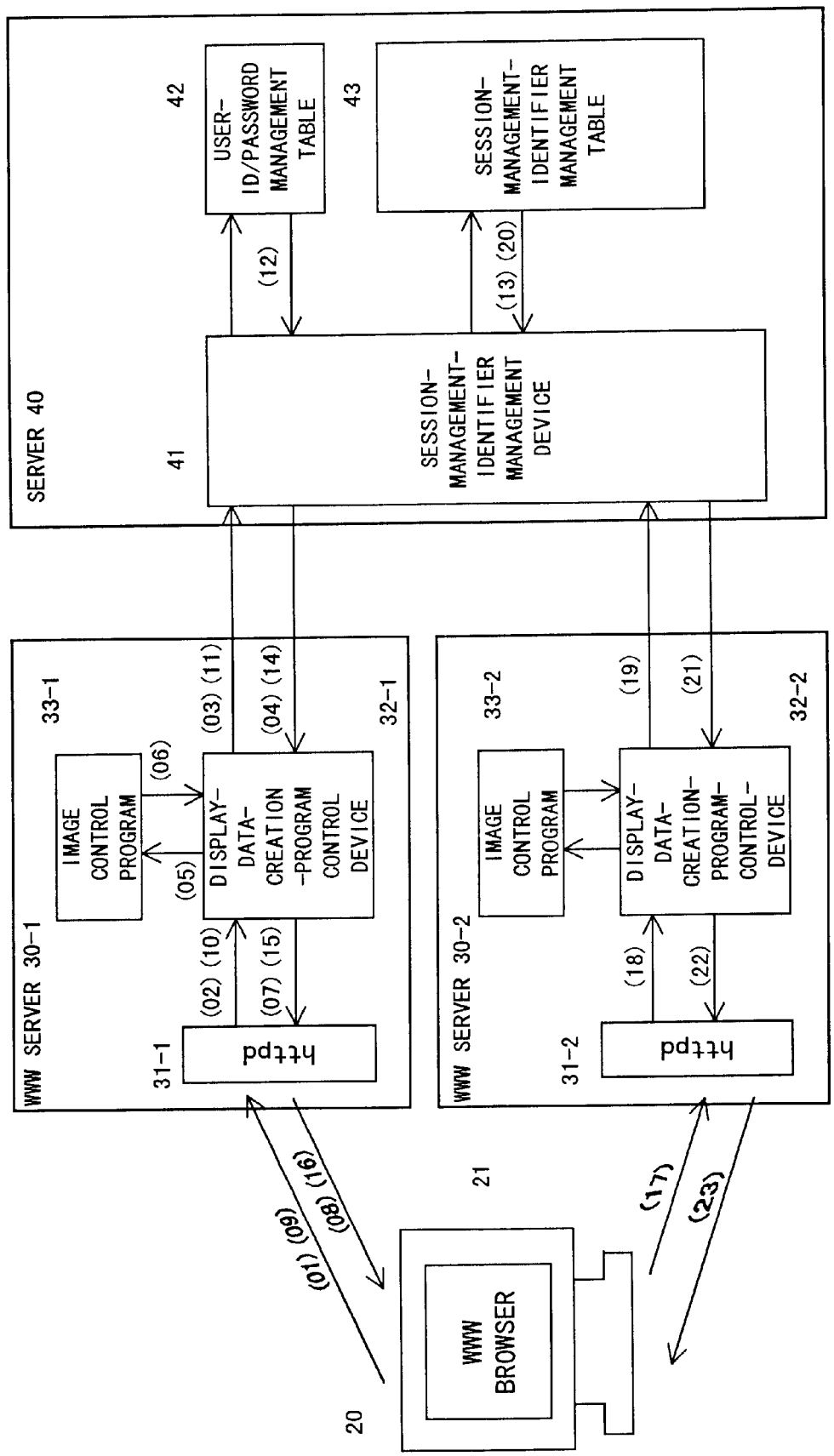
FIG. 2 is a block arrangement diagram showing the architecture of a client/server system in one aspect of performance of the present invention, and the operation of the system during the authentication of a user.

FIG. 1 is a block arrangement diagram showing the principle of the present invention.

The present invention is premised on a system wherein a plurality of users 1 (1-1 to 1-m), and a plurality of servers of first type 3 (3-1 to 3-n) for offering services to the users 1 are connected through a network 2, and wherein a server of second type 7 is connected with the plurality of servers of first type 3-1 to 3-n.

By the way, in the present invention, the word "user" is intended to mean the side of a request, and the word "server" the side of a reply to the request. That is, the respective words shall not be restricted to a user and a server in narrow senses. In general, man, information equipment, programs etc. capable of appropriate responses can become the request side (the user in the present invention) and the reply side (the server in the present invention).

Among the constituents of the system, each of the first type of servers 3 includes a transmission/reception unit 4 and a control unit 5.

The transmission/reception unit 4 transmits and receives data to and from the plurality of servers 1-1 to 1-m through the network 2.

The control unit 5 accepts from the transmission/reception unit 4 a request made by a first user being one of the plurality of users 1-1 to 1-m, and it sends the request to the second type of server 7. Besides, the control unit 5 offers the service complying with the request made by the first user, if a reply to the request as accepted from the second type of server 7 indicates that the first user has been authenticated.

On the other hand, the second type of server 7 includes an authentication control unit 8 and a session-management-identifier storage unit 9.

The authentication control unit 8 sends notification indicating that the first user has been authenticated, as the reply to the first type of server 3 if a session management identifier contained in the request as accepted from the first type of server 3 agrees with any of session management identifiers stored in the session-management-identifier storage unit 9.

The session-management-identifier storage unit 9 stores therein the session management identifiers which uniquely identify the sessions of the first type of servers 3 with the respective users 1-1 to 1-m.

This session-management-identifier storage unit 9 can also be so constructed that information items indicating the beginning times of the sessions to which the stored session management identifiers are respectively assigned are further stored in correspondence with these session management identifiers.

In this case, the authentication control unit 8 sends notification indicating that the authentication is necessary, as the reply to the first type of server 3 when the session identified by the session management identifier contained in the request as accepted from the first type of server 3 has lapsed for, at least, a prescribed time period since the beginning time.

The present invention can also be constructed as follows: If the session management identifier is not contained in the request, the authentication control unit 8 sends notification indicating that authentication is necessary, as the reply to the first type of server 3. Herein, if the reply to the request as accepted from the authentication control unit B is the notification indicating that the authentication is necessary, the control unit 5 requests the first user to transmit information for the authentication.

The connection 6 between the first type of servers 3-1 to 3-n and the second type of server 7 can be implemented by the network 2 or by a second network different from the network 2.

Further, the network 2 can be built by the Internet technology. In this regard, the present invention can also be so constructed that the session management identifier is affixed to URLs (Uniform Resource Locators) so as to be transferred between the user and the plurality of servers.

In the above construction of the present invention, the second type of server 7 can also be so constructed as to include all the functions of the first type of server 3 and to be one of the first type of servers 3-1 to 3-n.

As a second aspect based on the construction of the present invention described above, the second type of server 7 can further include an authentication-information storage unit in which information items for authenticating the users 1-1 to 1-m are stored.

In this case, the control unit 5 sends to the second type of server 7 the authenticating information which has been transmitted in from the first user in response to the request for the transmission of the authenticating information. If the authenticating information transmitted in from the first user agrees with any of the information items stored in the authentication-information storage unit, the authentication control unit 8 included in the second type of server 7 assigns the session management identifier to the session with the first user and stores it in the session-management-identifier storage unit 9.

As a third aspect based on the construction of the second aspect of the present invention, each of the first type of servers 3-1 to 3-n can further include an image control unit which generates image data for requesting the user 1 to transmit the authenticating information.

In this case, if the reply to the request as accepted from the second type of server 7 is the notification indicating the necessity of the authentication, the control unit 5 causes the image control unit to generate the image data and transmits the generated image data to the first user as the request for the transmission of the authenticating information.

Besides, in the present invention, the functions on the second type of server 7 can be implemented on the first type of servers 3-1 to 3-n.

By way of example, the functions on the second type of server 7 can also be implemented on one or more of the first type of servers 3 without disposing the second type of server 7 which is separate from the first type of servers 3.

Meanwhile, the present invention shall cover a method of managing the sessions between a plurality of users 1 (1-1 to 1-m) and a plurality of servers 3 (3-1 to 3-n) which are connected with the users 1-1 to 1-m through a network 2.

In this case, the first type of server 3 which has received a request from a first user being one of the plurality of users 1-1 to 1-m sends information based on the request to a second type of server 7. If any of session management identifiers for uniquely identifying the sessions with the respective users is contained in the information sent from the first type of server 3, the second type of server 7 notifies the first type of server 3 that the first user has been authenticated. Herein, when the notification from the second type of server 7 indicates that the first user has been authenticated, the first type of server 3 offers the first user a service which complies with the request.

Further, the session management method according to the present invention can be constructed as follows: If the session management identifier is not contained in the information sent from the first type of server 3, the second type of server 7 notifies the first type of server 3 that the first user needs to be authenticated. Herein, when the notification from the second type of server 7 indicates that the first user needs to be authenticated, the first type of server 3 requests the first user to transmit information for the authentication.

Moreover, the scope of the present invention shall cover recording media each storing therein a program which is run by a computer constituting any of the servers mentioned above.

In this case, when the program stored in the recording medium is run by the computer, this computer receives a request from a first user being one of a plurality of users 1-1 to 1-m and sends information based on the request to the second type of server 7. Thereafter, the computer offers the first user a service complying with the request, if notification responsive to the information as accepted from the second type of server 7 indicates that the first user has been authenticated, and it requests the first user to transmit information for authentication, if the notification indicates that the first user needs to be authenticated.

Alternatively, the computer accepts information based on a request transmitted from a user 1, from the first type of server 3. If any of session management identifiers for uniquely identifying sessions with the respective users 1 is contained in the information, the computer notifies the server 3 having sent the information that the user has been authenticated. On the other hand, if the session management identifier is not contained in the information, the computer notifies the server 3 that the user needs to be authenticated.

According to the present invention, once the user 1 has been authenticated, the session management identifier for managing the session with the user 1 is stored and managed in the session-management-identifier storage unit 9. Therefore, even when the user 1 has made requests astride the plurality of servers of first type 3, the requests are administered as the identical session.

Besides, in the first type of server 3, any authenticating process need not be executed in the case of authenticating the user 1.

Furthermore, since information items necessary for the user authentication, such as user IDs and passwords, are collectively administered, they can be shared by the plurality of servers 3.

Now, one aspect of performance will be described in conjunction with an example of the application of the present invention to a system in which a user lying at a network terminal receives services from two WWW servers astride through a network. In this aspect of performance, it is assumed that the network be incarnated using the Internet which has a very large scale and which can be utilized at low cost.

Although, in this aspect of performance, the number of the WWW servers for offering the services to the user is limited to two for the sake of brevity, the present invention is not restricted thereto. In actuality, the present invention is readily applicable even in case of receiving services astride a still larger number of WWW servers.

Besides, this aspect of performance exemplifies that utilization of the services based on the WWW which employs the HTTP being currently the most popular as a protocol on the Internet. However, the present invention is not restricted thereto, but it can be applied to any client/server system wherein the employed communication protocol between a client and a server is a stateless communication protocol in which the relevance of communications is protected only once between a request made of the server by the client and a response made to the request by the server.

This aspect of performance will be explained below with reference to the drawings.

FIG. 2 is a block arrangement diagram showing the architecture of a client/server system in this aspect of performance, and the operation of the system during authentication.

The system illustrated in FIG. 2 includes a network terminal 20 at which a user receives services through a network, two WWW servers 30-1, 30-2 which offer services to the user through the network, and a server 40 which manages the session information of the network terminal 20.

The network terminal 20 is a terminal device which operates as a client for receiving the services from the WWW servers 30. It is connected with the plurality of client WWW servers 30 through the network by a WWW browser 21.

In addition, each of the WWW servers 30-1, 30-2 includes an httpd 31, a display-data-creation-program control device 32 and an image control program 33. The httpd 31 is a demon process which implements the communication function of the WWW server 30 based on the HTTP, and which establishes connection with the network terminal 20. The display-data-creation-program control device 32 is a device which controls a display-data creation program (not shown) interlocked with the WWW server 30. The image control program 33 is a program which, under the direction of the display-data-creation-program control device 32, generates display data for displaying a prompting image for requesting the user to transmit information for authentication, on the screen of the network terminal 20 of the user.

On the other hand, the server 40 includes a session-management-identifier management device 41, a user-ID/password management table 42 and a session-management-identifier management table 43. The session-management-identifier management device 41 is a device which authenticates the user by comparing a user ID and a password transmitted in from the user, with user IDs and passwords stored in the user-ID/password management table 42, and which manages session management identifiers etc. stored and held in the session-management-identifier management table 43. The user-ID/password management table 42 is a management table of ordinary format in which the user IDs, the passwords etc. necessary for the authentication are stored and held in association with one another, while the session-management-identifier management table 43 is a management table in which the session management identifiers are held together with the management information of users.

The authenticating operation in this aspect of performance will be explained below with reference to FIG. 2. Nos. (01) to (23) in the ensuing explanation correspond to Nos. indicated in FIG. 2.

The user to receive the service from the WWW server 30-1 is first connected with this WWW server 30-1 through the network by running the WWW browser 21 of the network terminal 20, and subsequently requests the WWW server 30-1 to access a membership page requiring the authentication of the user, with a URL (Uniform Resource Locator) designating the location of contents ((01) in FIG. 2).

In the WWW server 30-1, the httpd 31-1 receives the access request and activates the display-data-creation-program control device 32-1 ((02)). Herein, the httpd 31-1 notifies the display-data-creation-program control device 32-1 of the URL which is the address of the membership page of the user's access request. In the system of this aspect of performance, a session is managed in such a way that the session management identifier is incorporated into that query part of the URL which succeeds mark "?" in order to deliver a parameter, and that the resulting URL is exchanged between the network terminal 20 and the WWW server 30. At this point of time, however, the user is not authenticated yet, and hence, the session management identifier is not affixed to the URL.

The display-data-creation-program control device 32-1 invokes the session-management-identifier management device 41 included in the server 40, and delivers thereto the URL which is the address of the membership page as notified by the httpd 31 ((03)). Incidentally, unlike the whole URL, only the parameter part incorporated in the URL, may well be delivered to the session-management-identifier management device 41.

The session-management-identifier management device 41 checks if the membership page of the user's access request requires the authentication of the access requester, and if the session management identifier is incorporated in the URL, on the basis of the URL accepted from the display-data-creation-program control device 32-1.

If the session management identifier is not incorporated in the URL, the user is not authenticated yet. Further, if the requested page requires the authentication, the session-management-identifier management device 41 notifies the display-data-creation-program control device 32-1 that the user needs to be authenticated ((04)).

Upon accepting the notification, the display-data-creation-program control device 32-1 asks the image control program 33-1 to generate data for displaying an image (authentication-information transmitting request image) on the network terminal 20, the image requesting or prompting the user to input a user ID, a password etc. necessary for the authentication ((05)). The data of the authentication-information transmitting request image as generated by the image control program 33-1 is transmitted to the network terminal 20 through the httpd 31 by the display-data-creation-program control device 32-1, and the authentication-information transmitting request image is displayed on the network terminal 20 by the WWW browser 21 ((06), (07), (08)).

The user inputs his/her user ID and password necessary for the authentication in view of the authentication-information transmitting request image displayed on the network terminal 20 by the WWW browser 21. The inputted information items are transmitted to the WWW server 30-1 through the network by the network terminal 20, and are sent to the session-management-identifier management device 41 of the server 40 through the httpd 31-1 by the display-data-creation-program control device 32-1 of the WWW server 30-1 ((09), (10), (11)).

The session-management-identifier management device 41 authenticates the user by comparing the user ID and password with the user IDs and passwords entered in the user-ID/password management table 42 ((12)). If the inputted user ID and password agree with the entered ones as the result of the comparisons, the management device 41 generates a session management identifier as authentication processing, and it enters the generated session management identifier into the session-management-identifier management table 43 as an identifier for identifying the session of the WWW servers 30 with the particular user, together with the user ID, password etc. of the particular user ((13)). Besides, the management device 41 notifies the display-data-creation-program control device 32-1 that the user has been authenticated, simultaneously with sending the session management identifier ((14)). By the way, the sessionmanagement-identifier management table 43 will be explained later.

When it is notified by the session-management-identifier management device 41 that the user has been authenticated, the display-data-creation-program control device 32-1 incorporates the session management identifier allotted to the user, to the data of the membership page requested to be accessed by the user, and it transmits the resulting data to the network terminal 20 through the httpd 31-1 ((15), (16)). The WWW browser 21 interprets and executes the data, and displays the image of the membership page on the network terminal 20.

It is assumed that the user subsequently makes a request for accessing a membership page on the other WWW server 30-2 as requires user authentication ((17)). Since, at this point of time, the user has already been authenticated, the session management identifier is incorporated in an URL on this occasion.

In the WWW server 30-2, the httpd 31-2 receives the access request and activates the display-data-creation-program control device 32-2 ((18)). Herein, the httpd 31-2 notifies the display-data-creation-program control device 32-2 of the URL which is the address of the membership page of the user's access request.

The display-data-creation-program control device 32-2 invokes the session-management-identifier management device 41, and sends the URL notified by the httpd 31, to the session-management-identifier management device 41 ((19)).

The session-management-identifier management device 41 checks if the membership page of the user's access request requires the authentication of the access requester, and if the session management identifier is incorporated in the URL, on the basis of the URL accepted from the display-data-creation-program control device 32-2.

Since the access request has been made after the user authentication, the URL bears the session management identifier. The session-management-identifier management device 41 verifies that the user having made the access request has been authenticated, by checking if the session management identifier contained in the URL is entered in the session-management-identifier management table 43 ((20)). When it has been verified that the session management identifier is entered in the session-management-identifier management table 43, the session-management-identifier management device 41 has succeeded in verifying that the user has been authenticated, and it therefore notifies the display-data-creation-program control device 32-2 to that effect ((21)). In this aspect of performance, the notification is done by returning the session management identifier the entry of which in the session-management-identifier management table 43 has been verified, to the display-data-creation-program control device 32-2.

Upon accepting the notification, the display-data-creation-program control device 32-2 incorporates the session management identifier into the data of the requested membership page of the user's access request, without executing the processes for the user authentication, such as the request for inputting the user ID and the password, and it transmits the resulting data to the network terminal 20 of the user through the httpd 31-1 ((22), (23)).

In this manner, according to the system in this aspect of performance, once the user has been authenticated, he/she need not be authenticated again even in the request for accessing the other WWW server 30 and can access this WWW server 30. Thus, once the user has been authenticated, he/she can successively make requests for the plurality of WWW servers 30 without minding about the access to the different WWW server 30.

There will now be more detailed the processing of the system in the case where the user makes requests for accessing the plurality of WWW servers 30 after the completion of the user authentication.

FIG. 3 is a diagram showing the session management operation after the authentication, of the system in this aspect of performance.

In FIG. 3, the same constituents as in FIG. 2 bear the same reference numerals. The image control program 33 and the user-ID/password management table 42 in FIG. 2 are omitted from illustration as they are not operated after the user authentication.

Each of display-data creation programs 34 (34-1, 34-2) included in the WWW servers 30 in FIG. 3 consists of a plurality of programs which are controlled by the display-data-creation-program control device 32. One of the plurality of programs is selected under the direction of the display-data-creation-program control device 32, and it processes a service request made by the user, in interlocking with the WWW server 30. By the way, although only a case where the user's service request is a request for displaying a Web page will be referred to in the ensuing explanation, the user's request in this aspect of performance is not restricted only to the display request, but it can be any of other various requests such as the search of a database.

The session management operation between the client and the servers in this aspect of performance as proceeds in the case where the user has made requests for services astride the plurality of WWW servers 30-1, 30-2, will be explained below with reference to FIG. 3. Nos. (31) to (48) in the ensuing explanation correspond to Nos. indicated in FIG. 3.

When the user is to receive the service from the WWW server 30-1 after the completion of the user authentication, he/she first requests this WWW server 30-1 to offer the service, with a URL designating the location of the service and by running the WWW browser 21 of the network terminal 20 ((31) in FIG. 3). The service request is, for example, the aforementioned request for the Web page such as a membership page, or a request for the running of any program. By the way, in designating the service with the URL, the user does not directly input the URL at the network terminal 20, but he/she clicks with a mouse or the like a page which is displayed on the screen of the network terminal 20, whereby the URL of the requested page linked to the clicked page is transmitted to the WWW server 30-1.

The httpd 31-1 in the WWW server 30-1 receives the URL and activates the display-data-creation-program control device 32-1 ((32)). Herein, the httpd 31-1 notifies the display-data-creation-program control device 32-1 of the URL which has been received from the user. The URL bears the session management identifier which uniquely identifies the session between the user and the system. Here in the system, the sessions between the respective users and the system are managed by the session management identifiers.

FIGS. 4A, 4B and 4C are diagrams each showing an example of the format of an URL which is exchanged between the user and the system.

FIG. 4A illustrates the format of the URL which is transmitted from a non-authenticated user to the WWW server 30 in order to make a request for displaying a page. This URL is so formed that a scheme name "http:" is followed by a host name or path name "XXXX" indicating the location of contents, and by the file name "fname.html"

of an HTML file, behind which "aaaa" as a parameter "id" indicating a user ID and "bbbb" as a parameter "pw", indicating a password are afforded in succession to mark "?".

FIG. 4B illustrates the format of the URL which is transmitted to the WWW server 30 when a non-authenticated-user makes a request for running a CGI program. Although the format of the URL shown in FIG. 4B is nearly the same as in FIG. 4A, the file name "cgiprog.cgi" of the CGI program replacing the HTML file as a designated file is afforded.

Since each of the URLs shown in FIGS. 4A and 4B is from the non-authenticated user, a session management identifier is not yet incorporated in a query part succeeding the mark "?".

FIG. 4C illustrates the format of the URL which is transmitted to the WWW server 30 when the authenticated user makes the request for displaying the page. In the format of FIG. 4C, the session management identifier "cccc" of the session with the particular user is afforded as a parameter "sid" indicative of the session management identifier at the part succeeding the symbol "?" in FIG. 4A. In this manner, after the authentication of the user, the session management identifier is embedded as the parameter in the URL, and this URL is exchanged between the network terminal 20 and the WWW servers 30.

The display-data-creation-program control device 32-1 having accepted the URL of such a format from the httpd 31-1 sends the accepted URL as it is or the internal parameter part thereof, to the session-management-identifier management device 41 ((33)).

As stated before, the session-management-identifier management device 41 checks whether or not the session management identifier is incorporated in the URL, in other words, whether or not the current session is a novel one based on a non-authenticated user. Subject to the novel session, a new session management identifier is generated and is assigned to the current session, and management information items are entered into the session-management-identifier management table 43 together with the generated session management identifier.

On the other hand, in a case where the session management identifier is incorporated in the URL, the session-management-identifier management device 41 compares it with the session management identifiers entered in the session-management-identifier management table 43. When the session management identifier of the URL has agreed with any of the entered identifiers, management information items corresponding thereto are updated ((34)).

FIG. 5 is a diagram exemplifying the session management identifiers and the management information items which are recorded in the session-management-identifier management table 43.

Referring to FIG. 5, information items which correspond to the user ID and password of the user allotted to each session, an authentication beginning time, an end time, the session management identifier assigned to the session, and a final access time, are stored as the records for the session managed by the system in this aspect of performance, in the session-management-identifier management table 43. Among the management information items, the authentication beginning time is the time at which the authentication of the user has been completed, while the end time is the time which is a predetermined time period later than the authentication beginning time.

In the system, the time period for which the session can be continued by an authentication is previously determined. When a longer time period has lapsed, the user is asked to input the user ID and the password again, and the authentication processing is executed again. The end time is used for such a situation, as it is the time which is obtained by adding the prescribed time period, that is, the duration of the session, to the authentication beginning time. Regarding access later than the end time the user is requested to input the user ID and the password again.

In this aspect of performance, the prescribed time period is set at one hour. In FIG. 5, therefore, the authentication beginning time is 10:00, and the corresponding end time is 11:00 being one hour later than the former, in the records of the session with the user whose user ID is "AAAA". Likewise, the authentication beginning time is 10:05, and the corresponding end time is 11:05, in the records of the session with the user whose user ID is "BBBB".

Each time the user is authenticated by the system, the session management identifier is generated and is assigned to the particular session. Besides, the session management identifier is entered into the session-management-identifier management table 43 as information for identifying each session, together with the management information items of the particular session. Thenceforth, the session of the network terminal 20 with the respective WWW servers 30-1, 30-2 is managed in such a way that the session management identifier is incorporated in the URLs and is carried about or shared.

The final access time is the latest time at which the user has accessed either of the WWW servers 30 with the particular session, and it is updated each time the user accesses the WWW server 30. The session-management-identifier management device 41 compares the final access time with the end time, and it requests the user to input the information for re-authentication processing if the final access time is later than the end time.

By the way, the time information items are also used for managing the records contained in the session-management-identifier management table 43. More specifically, the records which have become sufficiently old and unnecessary are deleted on the basis of the time information items, or they are retained as the access log of the system in a separate file and are used for the fault processing etc. of the system. The process for readjusting the records is executed every predetermined term or at need, whereby a necessary free capacity is always reserved in the session-management-identifier management table 43.

After having updated the corresponding management information items of the session-management-identifier management table 43 the session-management-identifier management device 41 notifies the display-data-creation-program control device 32-1 of the session management identifier assigned to the session with the particular user ((35)). In the case of FIG. 3, the user authentication has been done, so that the session management identifier in the notification becomes the same as the session management identifier borne in the URL transmitted from the WWW browser 21.

Upon accepting the session management identifier, the display-data-creation-program control device 32-1 selects one of the plurality of programs of the display-data-creation program 34-1 as corresponds to the URL designated by the user, and it activates and runs the selected program ((36)).

The display-data-creation program 34-1 creates display data on the basis of the user's instruction, and sends the created data to the display-data-creation-program control device 32-1 ((37)).

The display-data-creation-program control device 32-1 incorporates the session management identifier into the display data delivered from the display-data-creation program 34-1, and transmits the resulting display data to the WWW browser 21 through the httpd 31-1 ((38), (39)). In accordance with the received data, the WWW browser 21 displays on the network terminal 20 an image for the service desired by the user.

FIG. 6 shows an example of the display data in which the session management identifier is incorporated.

In the example of FIG. 6, the display of a WWW page is described by the HTML (Hyper Text Markup Language). Anchors stated at lines 61 and 62 at which hyperlinks to other pages bear the session management identifier (=yyyy) together with corresponding link information. The WWW browser 21 on the network terminal 20 interprets the data described by the HTML as shown in FIG. 6, and displays on the network terminal 20 an image as shown in FIG. 7.

In a case where the user wants to subsequently display the page of an image A, he/she clicks the display part 71 of "To Image A" on the display image 70 in FIG. 7 by the use of a mouse or the like. Likewise, in a case where the user wants to display the page of an image B, he/she clicks the display part 72 of "To Image B". Thus, the session management identifier is affixed to the URL corresponding to the image A or B and the resulting URL is transmitted to the WWW server 30. By way of example, when the part 71 is clicked, a file "a.html" to which the link is extended and which has a domain name of "xxxx" is accessed, and "yyyy" is transmitted as the session management identifier of the current session to the WWW server 30 in which the file "a.html" is located.

It is assumed that the user has subsequently requested the WWW server 30-2 different from the WWW server 30-1 to display a Web page, by means of the WWW browser 21 ((40)).

Figure 7:
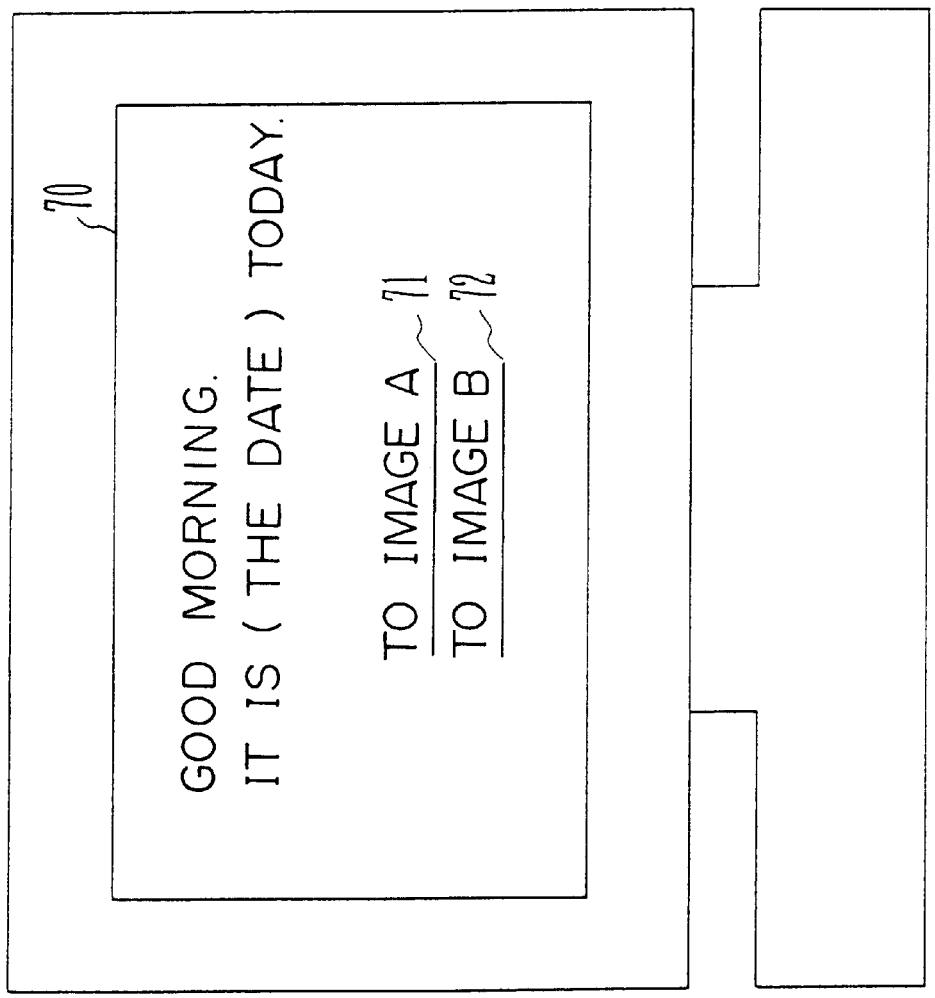
FIG. 7 is a diagram showing an example of an image which is displayed on a network terminal.

The display request which is made in the form of addressing based on the URL proceeds in such a way that the user clicks with the mouse or the like the display part of the desired hyperlink on the display image 70 of the network terminal 20 as shown in FIG. 7, whereby the URL of the destination of the hyperlink is transmitted from the network terminal 20 to the WWW server 30-2. Incorporated in this URL is the same session management identifier as affixed to the URL which the WWW browser 21 transmitted to the WWW server 30-1 at the step (31). The session management identifier is transmitted to the WWW server 30-2 together with the URL of the hyperlink destination.

In the WWW server 30-2, the httpd 31-2 accepts the request transmitted from the user and activates the display-data-creation-program control device 32-2. Subsequently, as in the case of the WWW server 30-1, the httpd 31-2 notifies the display-data-creation-program control device 32-2 of the URL of the display data requested by the user ((41)), and the display-data-creation-program control device 32-2 notifies the session-management-identifier management device 41 of the parameter incorporated in the URL ((42)).

The session-management-identifier management device 41 checks if the session management identifier exists as the parameter in the URL sent from the display-data-creation-program control device 32-2. Since the current session has already been entered, the session management identifier is incorporated in the URL transmitted from the user. The session-management-identifier management device 41 compares the accepted session management identifier with those entered in the session-management-identifier management table 43. If the accepted session management identifier agrees with any of the identifiers entered in the session-management-identifier management table 43, the management device 41 updates the management information items corresponding to the agreeing session management identifier ((43)), and it returns the agreeing identifier to the display-data-creation-program control device 32-2 in order to give notification to the effect that the current session with the user has been authenticated ((44)).

Upon accepting the session management identifier, the display-data-creation-program control device 32-2 selects one of the plurality of programs of the display-data-creation-program 34-2 as requested with the URL by the WWW browser 21, and it activates and runs the selected program ((45)).

The display-data-creation program 34-2 creates the data of the display image on the basis of the user's instruction, and delivers the created data to the display-data-creation-program control device 32-2 ((46)).

The display-data-creation-program control device 32-2 incorporates the session management identifier into the data of the display image delivered from the display-data-creation program 34-2, and transmits the resulting data to the WWW browser 21 through the httpd 31-2 ((47), (48)). The transmitted data is processed by the WWW browser 21, whereby the page desired by the user is displayed on the screen of the network terminal 20.

In this manner, according to this aspect of performance, the session management identifier can be carried about between the plurality of WWW servers 30. Therefore, even when the user has requested the plurality of WWW servers 30 to offer the services, the requests can be recognized as the identical session in the respective WWW servers, and session management striding or extending over the plurality of servers can be realized.

Next, processes in the individual devices included in the system will be described in detail with reference to flowcharts.

Figure 8:
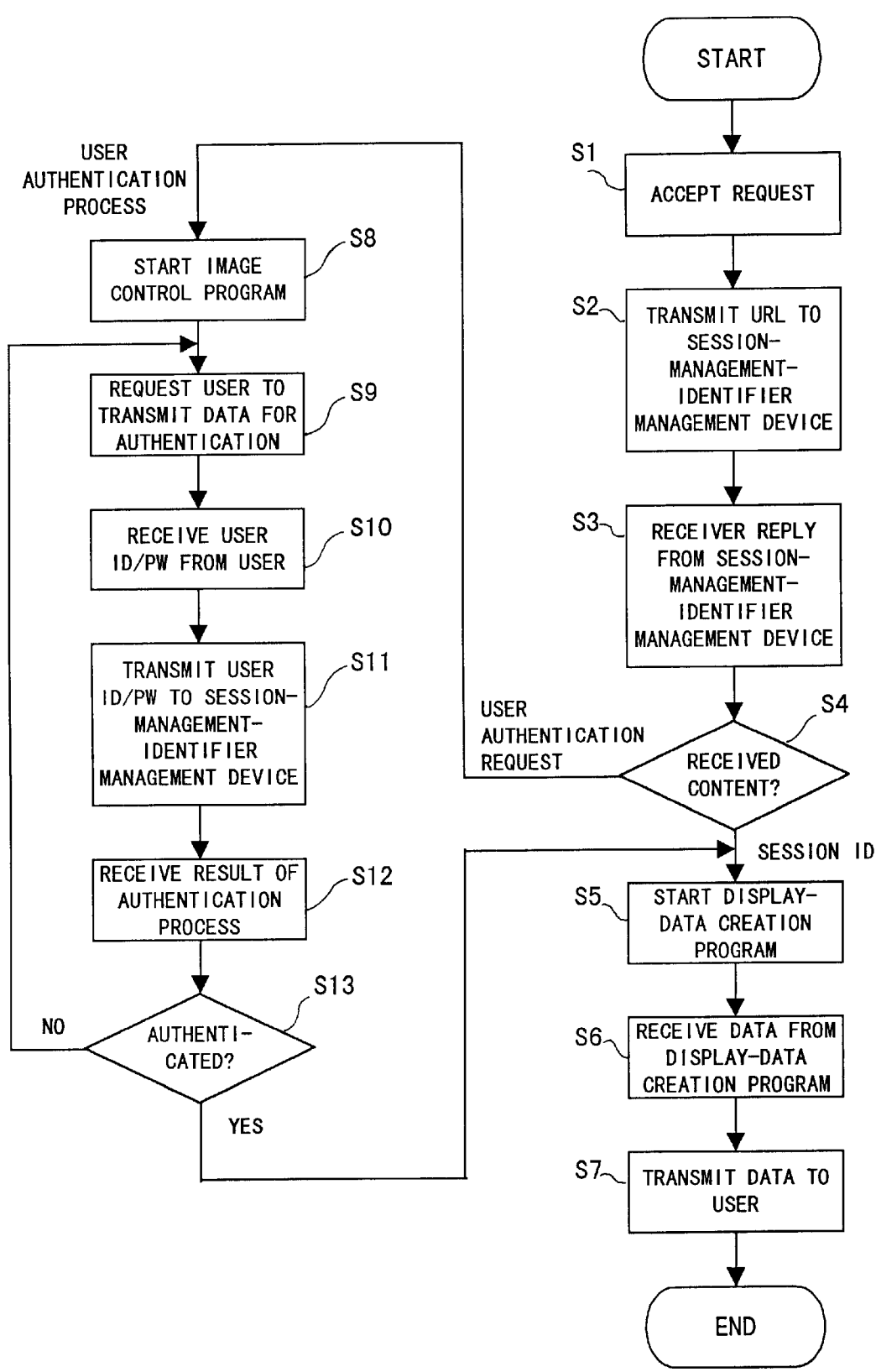
FIG. 8 is a flowchart showing a processing operation which is executed by a display-data-creation-program control device.

FIG. 8 is the flowchart showing a processing operation by the display-data-creation-program control device 32.

When the process has been started in FIG. 8, a request made by a user is first accepted in the form of a URL through the httpd 31 as a step S1. As a step S2, the display-data-creation-program control device 32 sends the URL to the session-management-identifier management device 41.

Subsequently, a reply to the sent URL is accepted from the session-management-identifier management device 41 (step S3). As a step S4, the content of the reply is judged.

If the reply is a request for asking the user to transmitting information for authentication (step S4, user .authentication request), the display-data-creation-program control device 32 activates the image control program 33 as the next step S8 so as to generate the data of an image for requesting the user to transmit the authenticating information. The generated data is transmitted to the network terminal 20 through the httpd 31, whereby the user is requested to transmit the authenticating information (step S9). As a step S10, the display-data-creation-program control device 32 receives from the user the user ID and password which are required for the authentication. Thereafter, as a step S11, the display-data-creation-program control device 32 sends the user ID and password to the session-management-identifier management device 41 and causes this management device 41 to execute a process for authenticating the user. Further, the display-data-creation-program control device 32 accepts the result of the authentication from the session-managementidentifier management device 41 (step S12). If the result indicates that the user is not authenticated yet (step S13, NO), the control flow returns to the step S9, at which the display-data-creation-program control device 32 requests the user to input the user ID and password again.

In contrast, if the result of the authenticating process as accepted from the session-management-identifier management device 41 at the step S13 is a session management identifier, it indicates that the user has already been authenticated (step S13, YES), and hence, the user authenticating process is ended. Subsequently, the processing is shifted to a step S5, one of the programs of the display-data creation program 34 as corresponds to an URL transmitted from the user is started to offer a service requested by the user.

After the user authenticating process has ended, or in a case where the user has been authenticated and where the reply from the session-management-identifier management device 41 at a step S4 is a session management identifier (step S4, session ID), one of the programs of the display-data creation program 34 as corresponds to the URL transmitted from the user is started (step S5). Thereafter, as a step S6, the control device 32 accepts data generated by the display-data creation program 34, from this creation program 34, and it embeds the session management identifier into the data. The resulting data is transmitted to the user (step S7). Then, the process is ended.

FIG. 9 is the flowchart showing the process by the session-management-identifier management device 41.

When the process has been started in FIG. 9, the session-management-identifier management device 41 first accepts a URL transmitted from a user or the parameter part of the URL, from the display-data-creation-program control device 32 as a step S21. Subsequently, the management device 41 checks if the URL transmitted from the user bears a session management identifier (step S22).

If the URL does not bear the session management identifier (step S22, NO), the session of the system with the user is not authenticated, and hence, the process is shifted to a step S27. Thenceforth, a process for authenticating the user is executed.

In contrast, if the URL bears the session management identifier at the step S22 (step S22, YES), this session management identifier is compared with session management identifiers entered in the session-management-identifier management table 43, as the next step S23. Herein, if any of the identifiers entered in the table 43 does not agree with the borne session management identifier, or if the current time of the process is later than an end time contained in corresponding management information items, in spite of the existence of an agreeing identifier in the table 43 (step S24, NO), the process is shifted to a step S27. Thenceforth, the authentication processing is executed again.

If the agreeing identifier is entered in the session-management-identifier management table 43 at the step S24 (step S24, YES), management information items corresponding to the agreeing session management identifier are updated as a step S25, and the accepted session management identifier is returned to the display-data-creation-program control device 32 (step S26). Then, the process is ended.

Besides, in the case where the current session is not authenticated, the session-management-identifier management device 41 first asks the display-data-creation-program control device 32 to make an authenticating request, as the authenticating process at the step S27.

Subsequently, as a step S28, the management device 41 accepts a user ID and password inputted in compliance with the authenticating request by the user, from the display-data-creation-program control device 32.

As the next step S29, the authenticating process is executed by comparing the accepted user ID and password with user IDs and passwords entered in the user-ID/password management table 42.

If, as a result, the accepted user ID and password do not agree with any of the user IDs and passwords entered in the user-ID/password management table 42 (step S30, NO), the management device 41 notifies the display-data-creation-program control device 32 to the effect that the user is not authenticated, as a step S34, whereupon the process is ended. In contrast, if the accepted user ID and password agree with any of the entered user IDs and passwords (step S30, YES), a session management identifier to be assigned to the current session is generated as a step S31, and it is entered into the session-management-identifier management table 43 (step S32). Further, the management device 41 issues the notification of the authentication by returning the session management identifier to the display-data-creation-program control device 32 (step S33). Then, the process is ended.

Figure 10A:
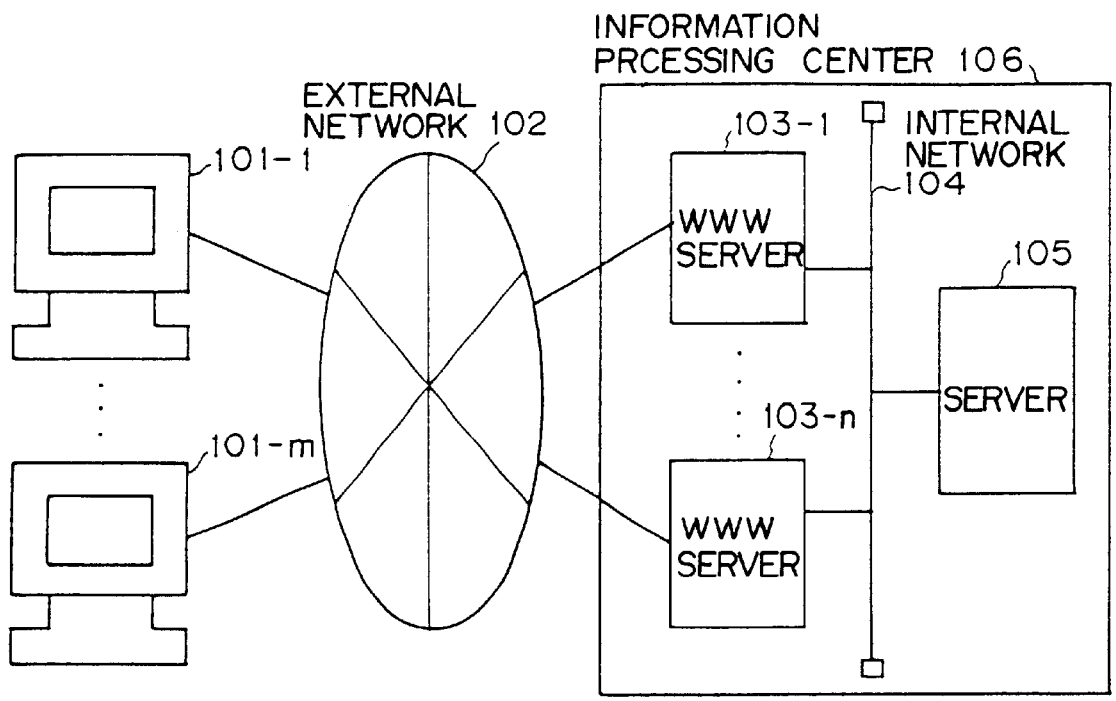
FIGS. 10A and 10B are diagrams each showing an example of the structure of a network in the client/server system.
Figure 10B:
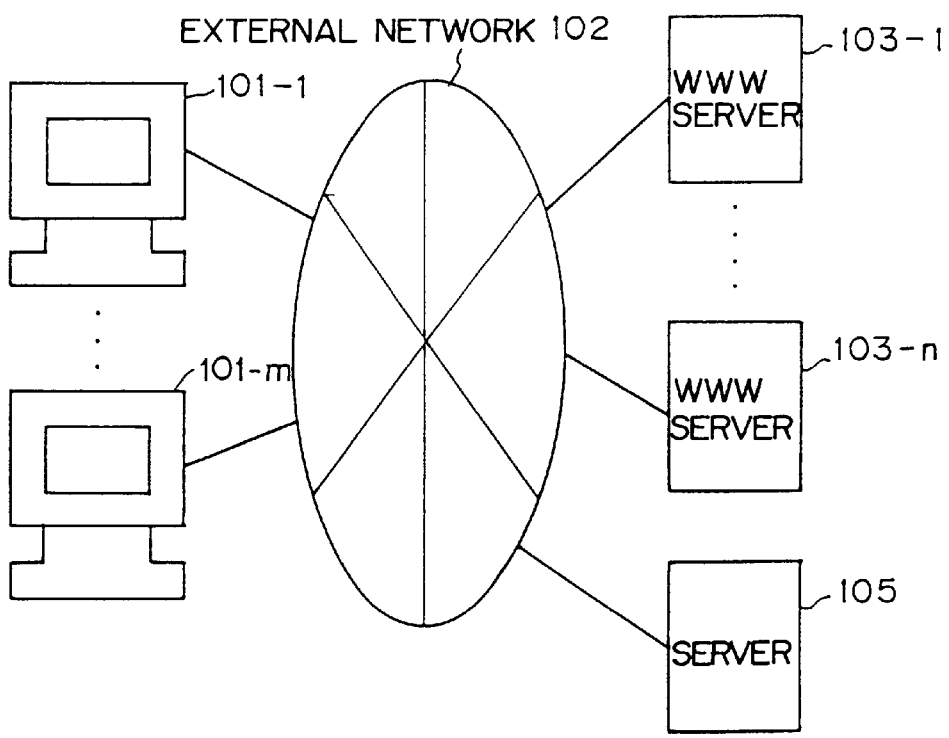

FIGS. 10A and 10B are diagrams each showing the network structure of the system described above.

In the system, a plurality of WWW servers 103-1 to 103-n which offer services to users, and network terminals 101-1 to 101-m which are operated -by the users are connected by an external network 102 such as the Internet, as shown in FIG. 10A. Besides, the respective WWW servers 103-1 to 103-n and a server 105 for administering session information are located in an identical information processing center 106, and they are connected by an internal network 104 in the information processing center 106. Herein, since the exchanges of data between the respective WWW servers 103-1 to 103-n and the server 105 are effected through the internal network 104, a high security is actualized.

Alternatively, the system can be realized by the structure in which the respective WWW servers 103-1 to 103-n and the server 105 are not connected by the dedicated internal network 104 as shown in FIG. 10A, but the respective WWW servers 103-1 to 103-n and the server 105 for administering the session information are connected by utilizing the external network 102 such as the Internet which connects the network terminals 101 and the WWW servers 103, as shown in FIG. 10B. With this structure, even in a case, for example, where the respective WWW servers 103 and the server 105 are not located in one place, the WWW server 103 and the server 105 can be readily connected merely by connecting them to the external network 102. By the way, in such a system configuration, it is desirable as a security countermeasure to connect the WWW server 103 and the server 105 by a VPN (Virtual Private Network).

Figure 11A:
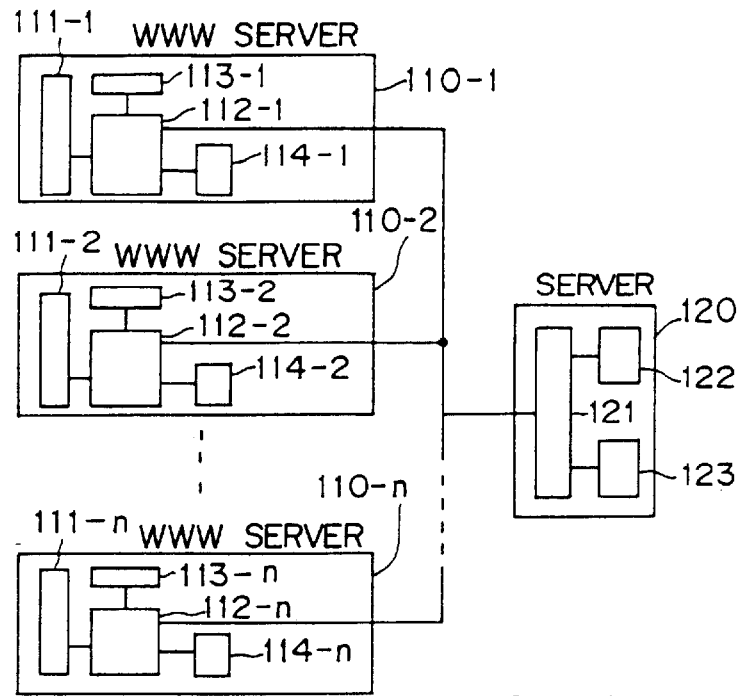
FIGS. 11A, 11B and 11C are block diagrams each showing an example of the arrangement of constituent devices in the client/server system.
Figure 11B:
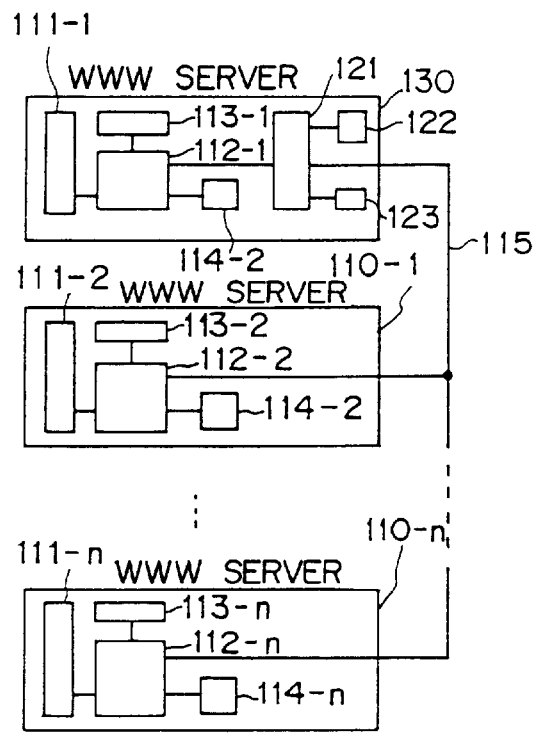
Figure 11C:
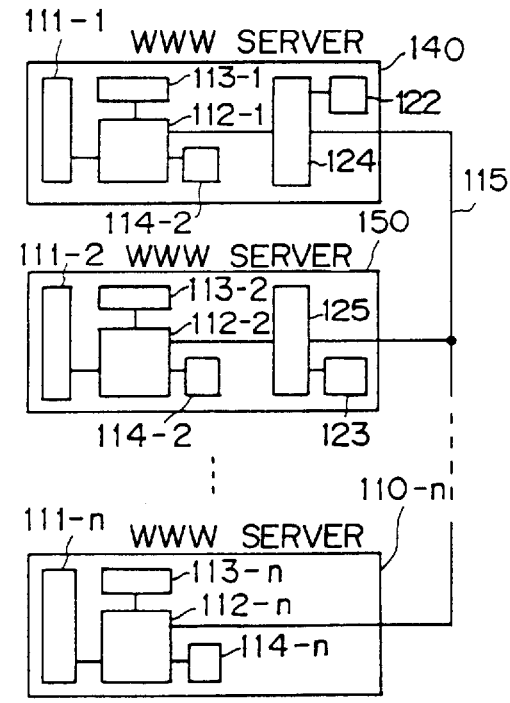

FIGS. 11A, 11B and 11C are block diagrams each showing an example of the arrangement of the constituent devices in the system.

In any of the system architectures thus far described, the WWW servers for offering the services to the users and the server for managing the sessions are separately disposed. Such an architecture is illustrated in FIG. 11A.

In FIG. 11A, an httpd 111, a display-data-creation-program control device 112, an image control program 113 and a display-data creation program 114 are arranged on each of respective WWW servers 110-1 to 110-n, while a session-management-identifier management device 121, a user-ID/password management table 122 and a session-management-identifier management table 123 are arranged on a server 120.

In the case of the architecture of FIG. 11A, information items concerning the sessions of the system with respective users are managed in the server 120. When accessed by the user, any of the WWW servers 110-1 to 110-n notifies a URL transmitted from the user, to the session-management-identifier management device 121 of the server 120, and it recognizes if the session with the user is one with the same user.

However, this aspect of performance is not restricted to the architecture in which the constituents for managing the sessions are distributively arranged on the server separate from the WWW servers as stated above, but the devices for the session management can also be arranged on the WWW server.

FIG. 11B exemplifies such an arrangement.

In FIG. 11B, a session-management-identifier management device 121, a user-ID/password management table 122 and a session-management-identifier management table 123 which are used for user authentication and session management are further arranged on one WWW server 130 among a plurality of WWW servers. In this case, when a user has accessed any of the WWW servers, the display-data-creation-program control device 112 of the WWW server 130 notifies a URL directly to the session-management-identifier management device 121 included in this server 130, and each of the other WWW servers 110-2 to 110-n notifies a URL to the session-management-identifier management device 121 of the WWW server 130 through a network 115.

Moreover, this aspect of performance is not restricted to the architecture in which the devices for the session management are arranged on one WWW server, but they can also be distributively arranged on a plurality of WWW servers.

FIG. 11C exemplifies such an arrangement.

In FIG. 11C, a user-ID/password management table 122 is arranged on a WWW server 140, while a session-management-identifier management table 123 is arranged on a WWW server 150. Besides, a session-management-identifier management device 121 is divided into a device 124 in charge of a user authenticating process and a device 125 in charge of session management, which are respectively arranged on WWW servers 140 and 150.

In the case where, in this manner, the devices included in the server 120 as shown in FIG. 11A are divided into ones for the authentication of the user and ones for the management of the session after the authentication and are distributively arranged on the WWW servers 140, 150, data must be exchanged between the WWW servers 140 and 150 more frequently than in the case of arranging all the devices on one WWW server 130 as shown in FIG. 11B, so that the overhead of the whole system becomes larger. However, loads can be respectively distributed to the WWW servers 140 and 150.

Incidentally, the network 115 for connecting the respective servers 110-1 to 110-n in each of the examples of FIGS. 11B and 11C may be based on either a LAN (Local Area Network) or an external network such as the Internet for connecting the servers with users.

Figure 12:
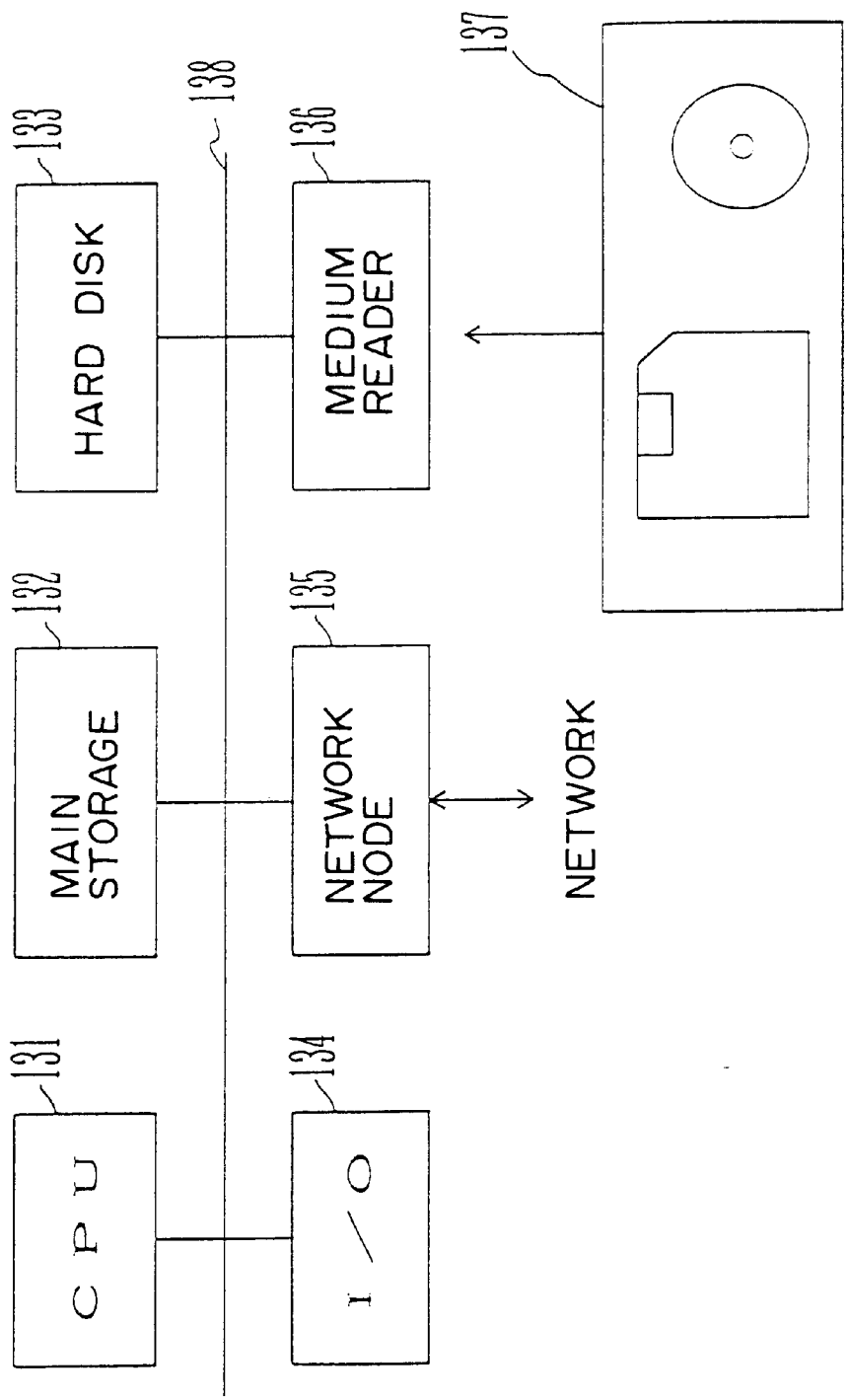
FIG. 12 is a diagram showing the environment of an information processing system in which the client/server system is employed.

FIG. 12 is a diagram showing the environment of an information processing system in each of clients, servers etc. which are employed in the system in this aspect of performance.

As shown in FIG. 12, the information processing system has an architecture which includes a CPU 131, a main storage 132, a hard disk device 133, input/output devices (I/O) 134 such as a display unit and a keyboard, a network node 135 such as modem, and a medium reader 136 for reading stored contents out of a portable storage medium 137 such as disk or magnetic tape, and in which the constituents are interconnected by a bus 138.

In the information processing system of FIG. 12, a program or data stored in the portable storage medium 137 such as magnetic tape, floppy disk, CD-ROM or MO is read out by the medium reader 136, and it is downloaded into the main storage 132 or the hard disk 133. Each of the processes according to this aspect of performance can also be implemented in software fashion in such a way that the CPU 131 runs the program or processes the data.

Moreover, in the information processing system, application software is sometimes changed by the use of the portable storage medium 137 such as floppy disk. Therefore, the present invention is not restricted to the session management system and management method, but it can also be constructed as the computer-readable storage medium 137 which, when used by a computer, causes the computer to fulfill the functions of the foregoing aspect of performance of the present invention.

Figure 13:
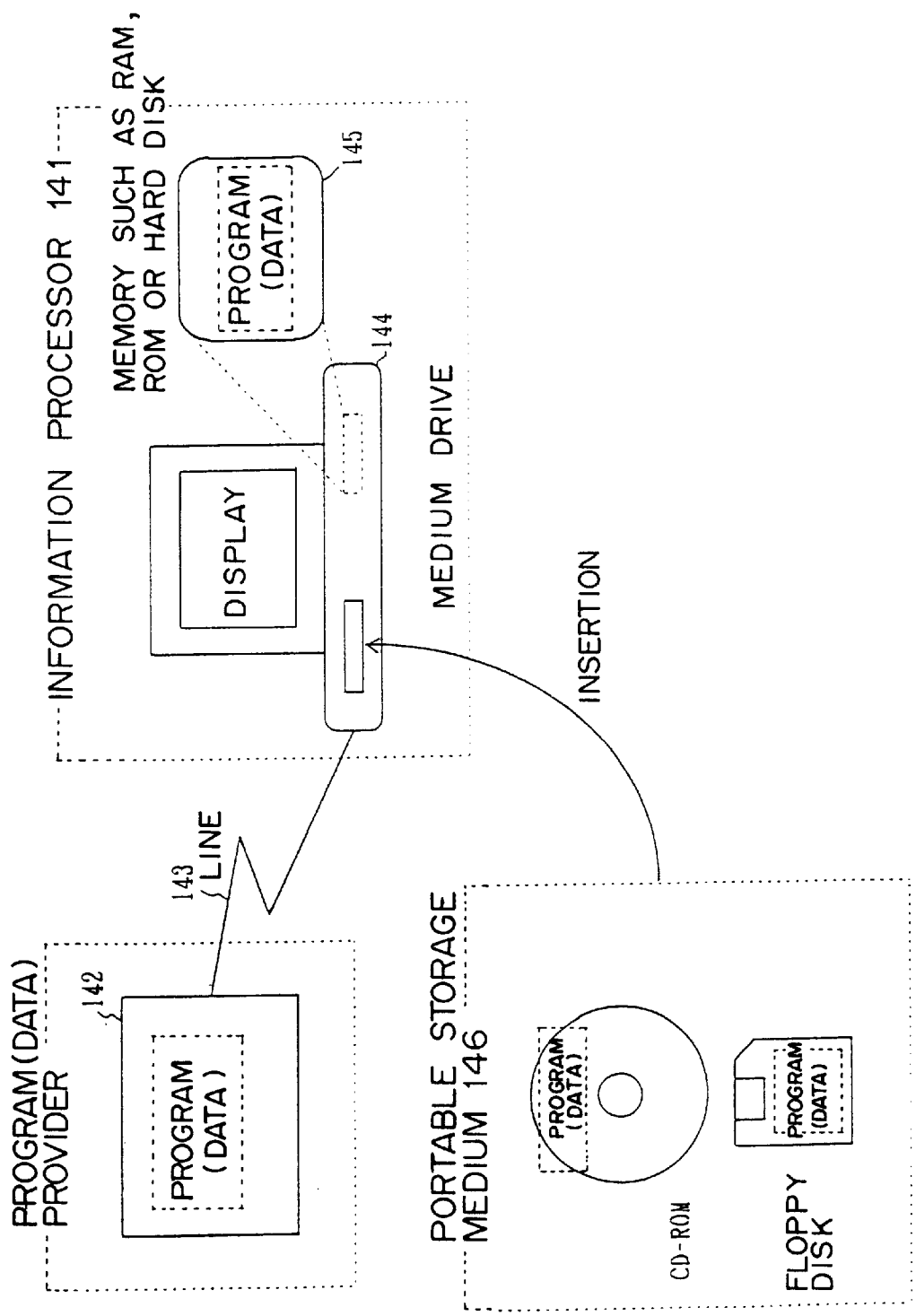
FIG. 13 is a diagram showing examples of storage media.

In this case, as shown in FIG. 13 by way of example, the "storage medium" shall cover a portable storage medium 146 which is detachably mounted on a medium drive 147, such as CD-ROM or floppy disk (or MO, DVD, removable hard disk or the like); storage means (such as a database) 142 in an external device (such as server), the data of which is transmitted via a network line 143; a memory (such as RAM or hard disk) 145 in the body 144 of an information processor 141; or the like. A program stored in the portable storage medium 146 or the storage means (such as database) 142 is loaded into the memory (such as RAM or hard disk) 145 in the body 144, and is run.

As described above, according to the present invention, once a user has been authenticated, even a request for accessing another server can be complied with without authenticating the user again. Thus, once the user has been authenticated for one server, he/she can access a plurality of servers in succession without minding about the accesses to the different servers.

Besides, in authenticating a user, the side of a WWW server need not execute an authenticating process and may merely invoke an image control program, so that the control of the WWW server is facilitated.

Further, since information items necessary for user authentication, such as a user ID and a password, are collectively administered, a plurality of WWW servers are permitted to use the common user ID and password.

In addition, an identical session management identifier can be carried about among a plurality of WWW servers, so that even when a user makes requests for the services of the plurality of WWW servers, the respective WWW servers can recognize the requests as an identical session, whereby session management striding or extending over the servers can be realized.

Moreover, the individual display-data creation programs of a WWW server need not execute processes for administering session management identifiers, as in the prior art, and a collective control becomes possible. Therefore, a plurality of WWW servers can be controlled by the same session management, and the respective display-data creation programs of existing specifications can be employed as they are.

What is claimed is:

1. A session management system in which a plurality of users, and a plurality of servers for offering web services to the users are connected through a network, comprising:

said plurality of servers distributively including
   a user authentication unit to store, at a first of the servers, user account information for identifying the users,
   a session-management-identifier storage unit to store, at a second of the servers, session management identifiers which uniquely identify sessions of said servers with respective users of the plurality of users, where the session management identifiers are generated by the second server accessing the information identifying the users stored at the first server, and
   an authentication control unit to send notification indicating that a user among the respective users has been authenticated, as a reply to information based on a request made by the user, if a session management identifier contained in the information accepted by the server itself or sent from another of said servers agrees with any of the session management identifiers stored in said session-management-identifier storage unit of the second of the servers; and
each of said plurality of servers further including
   a transmission/reception unit to transmit and receive data to and from said plurality of users through said network, and
   a control unit to accept the request made by the user from said transmission/reception unit, for sending said information based on said request-to said authentication control unit, and to offer the service complying with the user's request if the reply to said information as sent back from said authentication control unit is the notification indicating that the user has been authenticated.

2. The session management system as defined in claim 1, wherein
   said authentication control unit sends notification indicating that a user authentication is necessary, as said reply to the server having received said request from the user if the session management identifier is not contained in the information based on the request; and
   said control unit requests said user to transmit information for the user authentication, if said reply to the information based on the request is the notification indicating that the user authentication is necessary.

3. The session management system as defined in claim 2, wherein
   any of said plurality of servers further includes an authentication-information storage unit to store information for the user authentication therein;
   said control unit sends to said authentication control unit the information for the user authentication as transmitted in from said user in compliance with the request for transmitting the user authentication; and
   said authentication control unit assigns said session management identifier to the session with said user and stores it in said session-management identifier storage unit if said information for the user authentication as transmitted in from said user in compliance with the request for transmitting the user authentication information for the user authentication transmitted in from said user, via the server having received said request from the user, agrees with any of the user authenticating information stored in said authentication-information storage unit.

4. The session management system as defined in claim 2, wherein each server of said plurality of servers further includes a display control unit to generate display data for requesting said user to transmit the user authenticating information; and
   said control unit causes said display control unit to generate the display data and transmits said display data to said user as the request for transmitting said user authenticating information, if said reply to said first-mentioned information is said notification indicating that said user authentication is necessary.

5. The session management system as defined in claim 1, wherein
   said session-management-identifier storage unit stores therein information items indicative of beginning times of the sessions to which the stored session management identifiers are respectively assigned, in correspondence with said session management identifiers; and
   said authentication control unit sends notification indicating that authentication is necessary, as said reply to the server having received said request from said user when the session identified by said session management identifier contained in said information accepted from the server having received said request from said user has lapsed for, at least, a prescribed time period since the beginning time.

6. The session management system as defined in claim 1, wherein said network is built by the Internet technology, and said session management identifier is affixed to URL (Uniform Resource Locator) and is exchanged between said user and said plurality of servers, such exchange including sending the session management identifier with affixed URL from user to said plurality of servers when said user sends the request as a URL to said control unit.

7. The session management system as defined in claim 1, wherein
   any of said plurality of servers further includes an authentication-information storage unit to store information for the user authentication therein;
   said authentication control unit sends notification indicating that said authentication is necessary, as said reply to the server having received said request from said user, if the session management identifier is not contained in said information, and it generates and assigns said session management identifier to the session with said user and stores the assigned session management identifier in said session-management identifier storage unit if said authenticating information transmitted in from said user agrees with any of the user authenticating information stored in said authentication-information storage unit; and
   said control unit of said each server requests said user to transmit said authenticating information and sends to said authentication control unit said authenticating information transmitted in from said user in compliance with the authenticating-information transmitting request, if said reply to the first-mentioned information is said notification indicating that said authentication is necessary.

8. The system according to claim 1, wherein each server of said plurality of servers further includes a display-data-creation program for incorporating the session management identifier into service-identifying data of the service, and the display-data-creation program then supplies this service to said control unit before said control unit offers the service.

9. The system according to claim 8, wherein the service-identifying data incorporating the session management identifier is such that selection of the service-identifying data causes it to be used by said authentication control unit to check for agreement with the session management identifiers stored in said session-management-identifier storage unit.

10. A system including web servers which constitute a system for offering services to a plurality of users through a network, comprising:

a first web server comprising
- a transmission/reception unit to transmit and receive data to and from said plurality of users through said network, and
- a user authentication unit to store user account information for verifying users,
- a control unit to accept an original request string that both identifies a requested resource and includes a session identifier as a parameter of the string, made by the user from said transmission/reception unit, for sending the session identifier to a second web server which is one of said plurality of web servers, and for offering the service complying with the user's request if a reply to said information as sent back from said second web server indicates that said user has been authenticated; and the second web server comprising
- a session-management identifier storage unit storing session identifiers generated based on approval from the user authentication unit of the first web server,
- an authentication control unit to send notification indicating that a user among the respective users has been authenticated, as a reply to information based on a request made by the user, if a session management identifier contained in the information accepted by the server itself or sent from another of said servers agrees with any of the session management identifiers stored in said session-management-identifier storage unit, and
- a control unit capable of accepting the request made by the user from said transmission/reception unit, for sending said information based on said request-to said authentication control unit, and capable of offering the service complying with the user's request if the reply to said information as sent back from said authentication control unit is the notification indicating that the user has been authenticated.

11. A method for authorizing web server access, comprising:

requesting from a client, to a first web server, original access to a first resource at the first web server;

prompting for account authorization information at the client in response to said requesting;

validating the account authorization information, at the first web server, by comparing the account authorization information to user account information stored at the first web server, and in response storing corresponding validated session information at a second web server;

incorporating, at the first web server, the validated session information in a resource-request string contained in displayable data of the first requested resource;

displaying the first resource at the client; and selecting a resource-request string in the displayed first resource, the resource-request string referring to a second resource at the second web server, where the second web server validates session information of the second resource request string using the stored session information;

requesting from a second client to the second web server original access to a third resource at the second web server and in response prompting for second account information at the client, validating the account information at the first web server by comparing the second account information to the user account information stored at the first web server, and in response storing second validated session information at the second web server.

12. The method according to claim 11, further comprising authorizing access to the second resource corresponding to the selected resource-request string by the second web server comparing the validated session information stored at the second web server to the validated session information incorporated in the resource-request string sent to the first web server by the client.

* * * * *